Aug. 25, 1953

J. E. THOMPSON 2,650,343

DEVICE FOR END POINT DETERMINATION
IN FAT RENDERING PROCESS

Original Filed Nov. 9, 1949

Inventor
JOHN E. THOMPSON
By John F. Brezina
Attorney

Inventor
JOHN E. THOMPSON

Patented Aug. 25, 1953

2,650,343

UNITED STATES PATENT OFFICE 2,650,343

DEVICE FOR END POINT DETERMINATION IN FAT RENDERING PROCESS

John E. Thompson, Chicago, Ill.

Original application November 9, 1949, Serial No. 126,424. Divided and this application July 14, 1951, Serial No. 236,809

2 Claims. (Cl. 324—29)

This is a division of my currently pending application Ser. No. 126,424, which is now abandoned.

My invention relates to a novel apparatus and novel method for use in determining the end point in the rendering of fats and oils. More particularly my invention is adapted to provide for the registration of current flow in a commercial fat rendering process or the like and thereby provides a means by which an operator can determine when the cook is completed.

In the usual commercial method for rendering fat, the material from which the rendered fat is to be procured and produced is placed in a steam jacketed cooker or vessel, and the material is then subjected to elevated temperatures and pressures over an extended period of time during which the fat or oil becomes extracted from the cells of the material.

I have found that a temperature of approximately 270° F. for substantially two hours are optionally preferred conditions under which to extract fat in the usual circumstance. However, a number of ascertainable variables and a number of unknown variables influence the rendering process and, prior to my invention, it was necessary to rely solely on the judgment of an operator for determining the end point of the rendering operation.

Prior to my invention, certain phenomena had been found to be manifested in and coincident with a properly rendered fat or oil. However, in order to determine such phenomena it was necessary to remove a sample of the bath being rendered and submit it to tests and often by the time the test or analysis for the phenomena was completed the batch would be overcooked.

I have found that regardless of the length of the cook, maximum extraction, due to the cooking process, will have occurred at a desired end point in which other desired phenomena are also present, but additional cooking beyond the indicated desired end point will cause a burnt flavor to be produced in edible products, reduce the nutritive value of the rendered fat and residue and cause a reduced recovery of fat or oil which is subsequently pressed from the cooked residue. The poor recovery of fat or oil from the residue further reduces the value of protein residue which is most highly valuable when the fat or oil has been completely removed.

It is an important object of my invention to provide a convenient method by which an operator can determine the end point of the cook at the time it occurs so that the most highly desirable product may be discharged from the cooker immediately at the time of determination of said end point.

Prior to my invention numerous unsuccessful attempts have been made to determine an end point in fat rendering by electrical means. Unsuccessful attempts have been made to measure electrical phenomena at various stages of the cook or rendering operation. My invention successfully measures electrical phenomena during the cook so that the end point of the rendering operation may be known with certainty.

Other and further objects of my invention will become apparent from the following description and appended claims, reference being made to the accompanying drawings and numerals of reference thereon.

Figure 6:
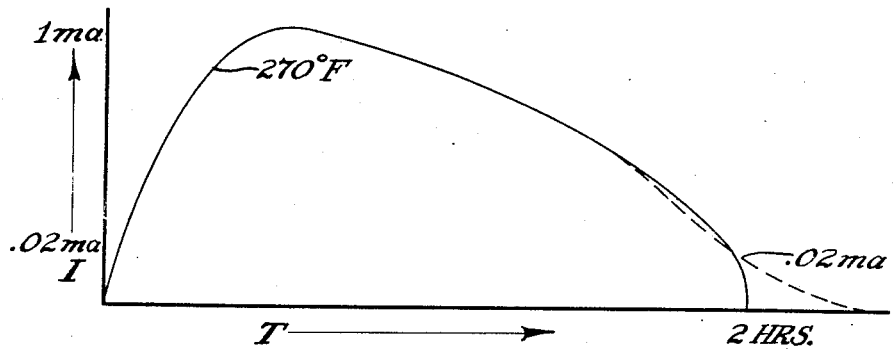
Fig. 6 is a diagrammatic view of a representative graph illustrating the current time relationship as observed.
Figure 7:
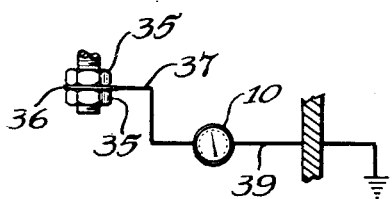
Fig. 7 illustrates a portion of the circuit in which the current flow is measured.

Although previous attempts at measuring a current in fat undergoing rendering have failed, my experimentation has illustrated that during the rendering process values substantially of 1 milliampere of current is generated. Referring to Fig. 6, which represents a typical graph of my observations, it will be noted that initially, at the beginning of the cook, no measurable current appears to be present. As the cook progresses a maximum temperature, of substantially 270° F., is reached a short time after the cooking has begun and at the point indicated in Fig. 6. Under the usual conditions of cooking, I keep the temperature at 270° F. Understand, however, that the 270° temperature is not critical with respect to my present invention. After the maximum temperature has been attained, the increase in the flow of current continues up until a point of approximately 1 milliampere is attained as indicated on the graph in Fig. 6. From the maximum point of current, the current recordings which I have observed indicate that the current drops gradually during the remainder of the cook until a point of about .02 milliampere is reached. Whereupon the registrable current which is generated in the cooking flat quickly drops to zero. Although in most of the observations I have found a sharp break point in the current at about .02 milliampere, a number of my observations have indicated that the current will continue to drop substantially at the same grade as during the major portion of the cook as illustrated by the dotted line in the graph. However, in a particular experiment, regardless of whether the current breaks, as illustrated, at .02 milliampere, or whether it gradually slopes, I have found that I achieve the maximum fat extraction at the substantially .02 milliampere. My research in this matter has indicated that prior to this point the fat extraction is not complete and that subsequent to the indicated point the rendered fat is overcooked. What analyses are used in determining undercook or overcook are not material and will not be discussed herein. Suffice it to say that an observer or operator cooking or rendering a batch of fat can determine with accuracy the point at which the cooking should cease merely by referring to a device such as a milliammeter designated as 10 in Fig. 7.

I have found that attempts to measure currents in samples which have been periodically removed from the cooking vessel have failed, but the phenomena which I have hereinbefore described have been observed from readings taken directly from the cooking fat.

Figure 1:
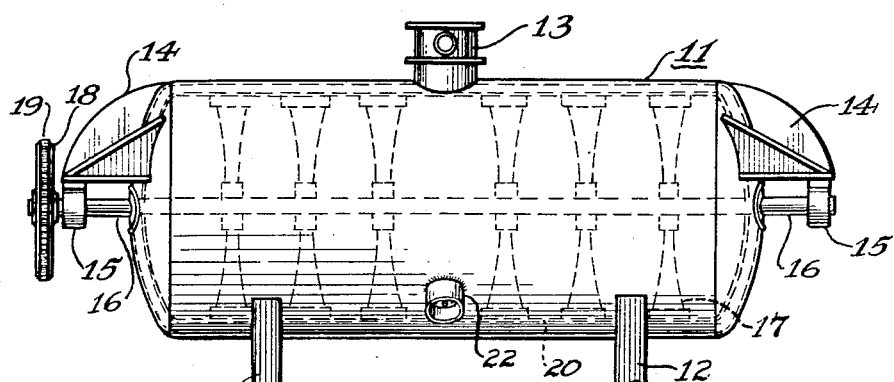
Fig. 1 is a side elevation of a conventional fat rendering device having my novel apparatus mounted therein.
Figure 2:
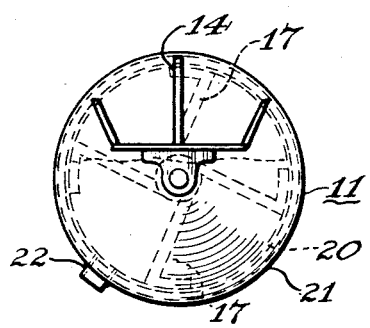
Fig. 2 is an end view of the cooker illustrated in Fig. 1.
Figure 3:
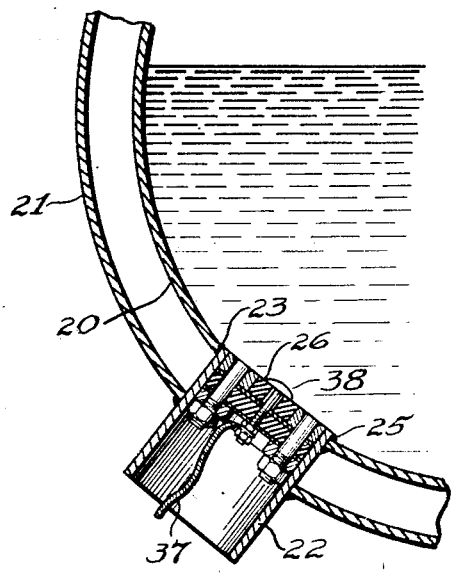
Fig. 3 is an enlarged fragmentary view taken on a cross-sectional plane parallel to the plane of Fig. 2 and illustrating the relation of my apparatus to the fat rendering cooker.
Figure 4:
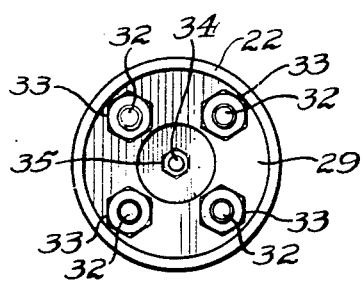
Fig. 4 is a plan view looking at the open end of my novel apparatus.
Figure 5:
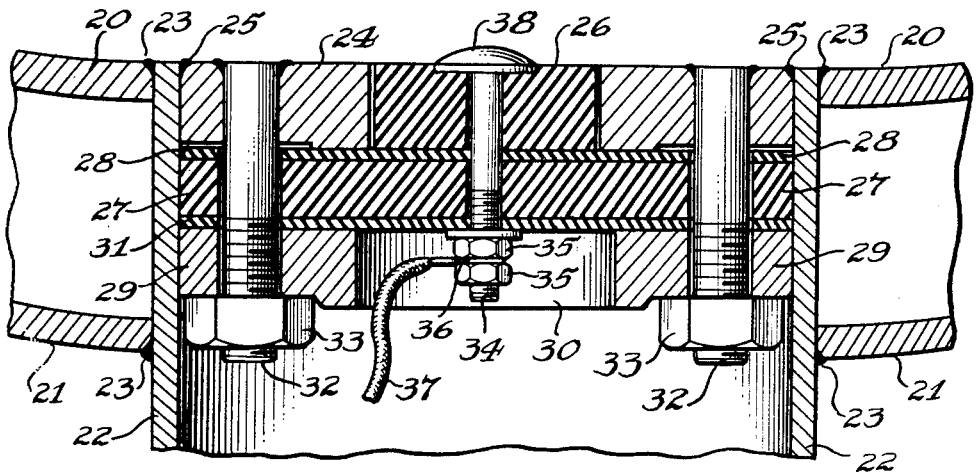
Fig. 5 is an enlarged detail cross-sectional view illustrating my device as shown in Fig. 4.

Referring more particularly to the device which I have found adapted for this use, numeral 11 designates a conventional pressure cooking vessel which is supported on a plurality of legs 12 and which has a charging conduit or opening 13 for introducing the material to be rendered. It will be noted that the cooker or rendering apparatus 11 has a plurality of end fins or ribs 14 each of which supports a journalling block or bracket 15 and in which an elongated longitudinally extending shaft 16 is journalled. A plurality of radially extending paddles 17 are mounted on the shaft 16 and groups of said paddles 17 are longitudinally spaced. One end of the shaft 16 carries a wheel or pulley 18 which is driven by a driven belt or chain 19. Referring to Figs. 2, 3 and 5, it will be seen that the cooker 11 includes an inner wall 20 and an outer wall 21.

I prefer to mount my novel apparatus at an intermediate point on the cooker 11 so that a representative current can be determined. Note that my novel apparatus comprises a cylinder 22 which may be a six inch steel pipe nipple. The outer wall of the cylinder 22 is suitably welded to the inner and outer walls 20 and 21 as indicated at 23 in Figs. 3 and 5. The cylinder 22 has an apertured base 24 which may be an ordinary steel flange which is welded to the walls of the cylinder 22 as illustrated at 25. Positioned or seated within the aperture of the base or annular flange 24 is a preferably centrally apertured inert insulator block or ring 26 such as Mycalex or the like or other suitable mica insulator. Mounted adjacent the block 26 is a second block or apertured insulating plate 27 which is preferably of a similar construction to the block 26. Numeral 28 designates a suitable pressure resistant apertured insulating gasket which I interpose between base 24 and the ring or block 27, said gasket extending over the base 24 and the Mycalex block 26 retained in the aperture in said base. Numeral 29 designates a ring preferably of steel having an enlarged central aperture 30 and between the ring 29 and the insulating block 27 I interpose a suitable pressure resistant gasket 31. Extending though the flange 24, the block 27 and ring 29 and the gaskets interposed therebetween and in suitably positioned apertures, are a plurality of pins 32 each of which has mounted on its threaded end a lock nut 33. The pins 32 as illustrated in Figs. 3 and 5 are suitably secured to secured flange 25.

Numeral 34 designates a preferably steel bolt or terminal which extends through the insulating blocks 26 and 27 and the gaskets 28 and 31 and through the aperture 30. It will be observed that the bolt or terminal 34 which has a threaded end does not contact any metal except for the opposed lock nuts 35 which have anchored therebetween the end terminal 36 of the wire 37 which leads to one terminal of the milliammeter 10. The bolt or terminal 34 has an enlarged head 38 which is in contact with the fat or the material being rendered which is in the cooker.

By a wire 39 one terminal of the milliammeter is grounded and such grounding may occur on a wall of the cylinder 22. This is done in order to cause a current to flow through the milliammeter.

It will be observed that I choose to have all of the elements of my novel device of steel or the like because steel has been found to be preferable for us in the processing of foods because it tends to minimize undesirable flavors and other objectionable phenomena. However, other metals work equally well.

As many changes could be made in the above construction, and as many apparently widely different embodiments of my invention within the scope of the claims could be constructed without departing from the spirit and scope thereof, it is intended that all matter contained in the acompanying specification shall be interpreted as illustrative and not in a limiting sense.

I claim:

1. In a fat rendering cooker; a housing extending through said cooker and secured to the walls of said cooker; an inwardly extending flange rigidly secured to one end of said housing; insulator block means having a central portion encircled by said flange and a radial portion overlapping one surface of said flange; a metal terminal supported by and extending through said insulator block means and having an end in contact with the material being rendered in said cooker; a retaining ring over said radial portion; a plurality of pins rigidly secured to said flange and having threaded ends, said pins extending outwardly from one surface of said flange and through registerable apertures in said insulating block means and said retaining ring; and nuts engaging with the threaded ends of said pins and grippable from without said cooker.

2. In a fat rendering cooker; a housing extending through and secured to the walls of said cooker; an inwardly extending radial flange rigidly secured to one end of said housing; insulating means including a block encircled by said flange and a plate overlapping one surface of said flange; a metal terminal supported by and extending through said insulating means and maintaining said block and plate in assembled relationship, said terminal having an end in contact with the material being rendered in said cooker; a retaining ring over said plate; a plurality of metal pins rigidly secured to said flange and having threaded ends, said pins extending outwardly from one surface of said flange and through registerable apertures in said plate and said retaining ring; and nuts engageable with the threaded ends of said pins and grippable from without said cooker.

JOHN E. THOMPSON.

References Cited in the file of this patent

UNITED STATES PATENTS

| Number | Name | Date |
| --- | --- | --- |
| Re. 23,282 | Thomson | Oct. 10, 1950 |
| 1,686,534 | Rosenzweig | Oct. 9, 1928 |
| 2,383,926 | White | Aug. 28, 1945 |
| 2,440,279 | Larkins, Jr. | Apr. 27, 1948 |
| 2,451,516 | Skobel | Oct. 19, 1948 |
| 2,551,034 | Merriman et al. | May 1, 1951 |